(12) United States Patent
Hsu

(10) Patent No.: US 9,867,251 B1
(45) Date of Patent: Jan. 9, 2018

(54) SILICON CONTROLLABLE DIMMING FULL-RANGE FLICKFREE CIRCUIT

(71) Applicant: Dong Guan Bright Yinhuey Lighting Co., Ltd, Guang Dong (CN)

(72) Inventor: Kevin Hsu, Taichung (TW)

(73) Assignee: Dong Guan Bright Yinhuey Lighting Co., Ltd, Guang Dong (CN)

( * ) Notice: Subject to any disclaimer, the term of this patent is extended or adjusted under 35 U.S.C. 154(b) by 0 days.

(21) Appl. No.: 15/461,892

(22) Filed: Mar. 17, 2017

(51) Int. Cl.
 *H05B 33/00* (2006.01)
 *H05B 33/08* (2006.01)
 *H02M 1/44* (2007.01)

(52) U.S. Cl.
 CPC .......... *H05B 33/0845* (2013.01); *H02M 1/44* (2013.01); *H05B 33/0815* (2013.01)

(58) Field of Classification Search
 CPC ............ H05B 33/0815; H05B 33/0845; H05B 33/0809; H05B 33/083; H05B 33/0824; H05B 37/02; H05B 39/044; H05B 39/04; H05B 39/048; H05B 33/0857; H05B 33/0818; H05B 33/0887; H05B 33/0848; H05B 33/0851
 See application file for complete search history.

(56) References Cited

U.S. PATENT DOCUMENTS

| | | | | |
|---|---|---|---|---|
| 5,612,597 A | * | 3/1997 | Wood ................... | H02M 1/425 315/209 R |
| 2009/0322237 A1 | * | 12/2009 | Bobel .................. | H05B 41/295 315/224 |
| 2011/0025217 A1 | * | 2/2011 | Zhan .................... | H02M 3/335 315/219 |

* cited by examiner

*Primary Examiner* — Monica C King
(74) *Attorney, Agent, or Firm* — Alan D. Kamrath; Kamrath IP Lawfirm, P.A.

(57) ABSTRACT

A silicon controllable dimming full-range flickfree circuit includes a dimming circuit and a flick elimination circuit which includes a metal oxide semiconductor (MOS) connected with an output terminal of the dimming circuit. The dimming circuit and the flick elimination circuit are combined, and the dimming circuit is provided with a silicon controllable dimming chip. Thus, when the MOS is worked at the constant current zone, the voltage of the source and the gate of the MOS is kept at a constant value, so that the current passing through the source and the drain of the MOS is kept at a constant value, to perform a flickfree feature of the full-power range of the high power factor, to stabilize the operation of the LED circuit, and to prevent the user's eyes from being hurt by the flick of the LED circuit.

6 Claims, 2 Drawing Sheets

SILICON CONTROLLABLE DIMMING FULL-RANGE FLICKFREE CIRCUIT

BACKGROUND OF THE INVENTION

1. Field of the Invention

The present invention relates to a dimming circuit and, more particularly, to a silicon controllable dimming full-range flickfree circuit.

2. Description of the Related Art

A light emitting diode (LED) is a semiconductor device that can directly convert an electric energy into a visible light. The LED has the features of energy-saving, environmental protection, high stability, short reaction time and long lifetime. The LED has a chip that is worked under a direct current condition so that the alternating current of the normal power supply has to be transferred into a direct current for operation of the LED. However, the voltage of the LED has a wave (in the form of a sine wave) that is vibrated between the peak and the trough during the cycle, to produce a flick phenomenon, thereby easily causing danger to the user's eyes.

BRIEF SUMMARY OF THE INVENTION

In accordance with the present invention, there is provided a silicon controllable dimming full-range flickfree circuit comprising a dimming circuit and a flick elimination circuit connected with the dimming circuit. The flick elimination circuit includes a metal oxide semiconductor (MOS). The MOS is connected with a positive pole or a negative pole of an output terminal of the dimming circuit.

When the MOS is connected with the positive pole of the output terminal of the dimming circuit, the flick elimination circuit further includes a first resistor, a capacitor, a first diode, a second diode and a second resistor. The first resistor is connected serially with the capacitor. The first resistor and the capacitor are connected in parallel with the positive and negative poles of the output terminal of the dimming circuit. The first diode is connected serially with the second diode. The first diode and the second diode are connected in parallel with the first resistor. The first diode has a negative pole connected with a positive pole of the second diode. The first diode has a positive pole connected with the positive pole of the output terminal of the dimming circuit. The MOS has a gate connected with a connecting circuit between the first resistor and the capacitor through the second resistor. The MOS has a source functioning as a positive output terminal connected with a light emitting diode (LED) circuit.

When the MOS is connected with the negative pole of the output terminal of the dimming circuit, the flick elimination circuit further includes a first resistor, a capacitor, a first diode, a second diode and a second resistor. The MOS has a source connected with the negative pole of the output terminal of the dimming circuit through the second resistor. The MOS has a gate connected with the negative pole of the output terminal of the dimming circuit through the capacitor. The first resistor has two ends connected respectively with the gate and the drain of the MOS. The first diode is connected serially with the second diode. The first diode and the second diode are connected in parallel with the first resistor. The first diode and the second diode are arranged in different directions. The first diode has a negative pole connected with the negative pole of the second diode. The drain of the MOS functions as a negative output terminal connected with the LED circuit.

Preferably, the flick elimination circuit further includes a resistor and a capacitor. The resistor and the capacitor construct an LC parallel connection circuit. The output terminal of the dimming circuit, the resistor and the capacitor are connected in parallel.

Preferably, the resistor and the capacitor have a time constant which is preset to be equal to or greater than 10 ms (milliseconds).

Preferably, the dimming circuit includes an EMI (electromagnetic interference) filter rectifying circuit, an RC absorption circuit, a PWM (pulse-width modulation) control circuit, a DC-to-DC converter circuit and an output rectifier filter circuit. The EMI filter rectifying circuit, the RC absorption circuit, the DC-to-DC converter circuit and the output rectifier filter circuit are in turn connected serially. The PWM control circuit is connected respectively with the EMI filter rectifying circuit and the DC-to-DC converter circuit.

Preferably, the dimming circuit further includes a dimming signal detection circuit connected between the EMI filter rectifying circuit and the PWM control circuit so that the PWM control circuit is connected with the EMI filter rectifying circuit through the dimming signal detection circuit.

Preferably, the PWM control circuit is provided with a silicon controllable dimming chip.

According to the primary advantage of the present invention, the dimming circuit and the flick elimination circuit are combined, and the dimming circuit is provided with a silicon controllable dimming chip.

According to another advantage of the present invention, when the gate of the MOS is kept at the constant current zone, the voltage of the source and the gate of the MOS is kept at a constant value, so that the current passing through the source and the drain of the MOS is kept at a constant value, to perform a flickfree feature of the full-power range of the high power factor, to stabilize the operation of the LED circuit, and to prevent the user's eyes from being hurt by the flick phenomenon of the LED circuit.

Further benefits and advantages of the present invention will become apparent after a careful reading of the detailed description with appropriate reference to the accompanying drawings.

DETAILED DESCRIPTION OF THE INVENTION

Figure 1:
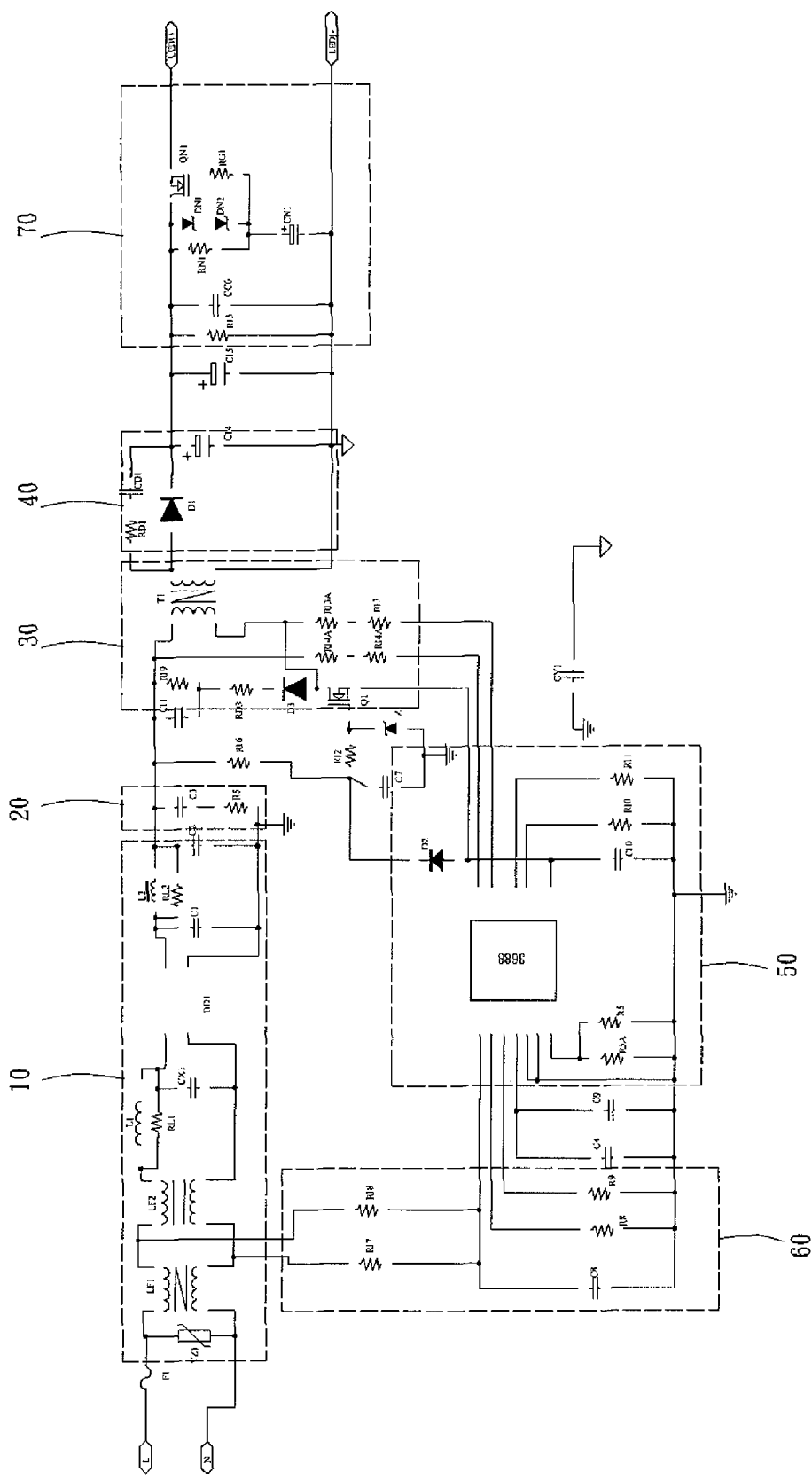
FIG. 1 is a circuit diagram of a silicon controllable dimming full-range flickfree circuit in accordance with the first preferred embodiment of the present invention.

Referring to the drawings and initially to FIG. 1, a silicon controllable dimming full-range flickfree circuit in accordance with the first preferred embodiment of the present invention comprises a dimming circuit and a flick elimination circuit 70 connected with the dimming circuit. The dimming circuit is used to filter and rectify a light emitting diode (LED) circuit. The flick elimination circuit 70 is used to eliminate the flick of an electric signal outputted by the dimming circuit. The LED circuit is connected with an output terminal of the flick elimination circuit 70.

The dimming circuit includes an EMI (electromagnetic interference) filter rectifying circuit 10, an RC absorption circuit 20, a PWM (pulse-width modulation) control circuit 50, a DC-to-DC converter circuit 30 and an output rectifier filter circuit 40. The EMI filter rectifying circuit 10, the RC absorption circuit 20, the DC-to-DC converter circuit 30 and the output rectifier filter circuit 40 are in turn connected serially. The PWM control circuit 50 is provided with a silicon controllable dimming chip (IW3688). The PWM control circuit 50 is connected respectively with the EMI filter rectifying circuit 10 and the DC-to-DC converter circuit 30. The dimming circuit further includes a dimming signal detection circuit 60 connected between the EMI filter rectifying circuit 10 and the PWM control circuit 50 so that the PWM control circuit 50 is connected with the EMI filter rectifying circuit 10 through the dimming signal detection circuit 60. The PWM control circuit 50 calibrates the power factor of the EMI filter rectifying circuit 10, and changes the current peak value connected by the PWM control circuit 50 by regulating the magnitude of the direct-current voltage signal, so as to perform a dimming operation on the LED circuit.

The flick elimination circuit 70 includes a resistor (RN1), a capacitor (CN1), a diode (DN1), a diode (DN2), a resistor (RG1) and a metal oxide semiconductor (MOS) (QN1). The resistor (RN1) is connected serially with the capacitor (CN1). The resistor (RN1) and the capacitor (CN1) are connected in parallel with positive and negative poles of an output terminal of the dimming circuit. The diode (DN1) is connected serially with the diode (DN2). The diode (DN1) and the diode (DN2) are connected in parallel with the resistor (RN1). The diode (DN1) has a negative pole (K) connected with a positive pole (A) of the diode (DN2). The diode (DN1) has a positive pole (A) connected with the positive pole of the output terminal of the dimming circuit. The MOS (QN1) is connected with the positive pole of the output terminal of the dimming circuit. The MOS (QN1) has a gate connected with a connecting circuit between the resistor (RN1) and the capacitor (CN1) through the resistor (RG1). The MOS (QN1) has a source functioning as a positive output terminal connected with the LED circuit, for supplying an electric power to the LED circuit. Preferably, the flick elimination circuit 70 further includes a resistor (R15) and a capacitor (CC6). The resistor (R15) and the capacitor (CC6) construct an LC parallel connection circuit. The output terminal of the dimming circuit, the resistor (R15) and the capacitor (CC6) are connected in parallel.

The operation of the silicon controllable dimming full-range flickfree circuit of the present invention is described as follows.

The resistor (RN1) and the capacitor (CN1) of the flick elimination circuit 70 construct an integrated filter circuit to eliminate the power frequency ripple by provision of the MOS (QN1). The diode (DN1) and the diode (DN2) of the flick elimination circuit 70 provide a quick charging function by provision of the capacitor (CN1), and suppress the capacitor (CN1) from being discharged so as to prevent the MOS (QN1) from being broken.

In addition, the MOS (QN1) is controlled to work at the constant current zone, and the voltage of the source and the gate of the MOS (QN1) is kept at a constant value, so that the current passing through the source and the drain of the MOS (QN1) is kept at a constant value.

Further, the time constant of the resistor (RN1) and the capacitor (CN1) is preset to be equal to or greater than 10 ms (milliseconds), so that the integrated filter circuit constructed by the resistor (RN1) and the capacitor (CN1) can eliminate an alternating current ripple (about 100 Hz) of the output voltage of the drive circuit (or the silicon controllable dimming full-range flickfree circuit) of the LED circuit, so that the minimum frequency of the alternating current ripple eliminated by the integrated filter circuit is about 10 Hz. It is to be noted that, the time constant of the resistor (RN1) and the capacitor (CN1) is equal to RN1*CN1.

Further, the threshold voltage (VTH) of the MOS (QN1) is a constant. When the MOS (QN1) is kept at the constant current zone, the current (IDS) between the source and the drain of the MOS (QN1) is kept at a constant value if the voltage (VGS) between the source and the gate of the MOS (QN1) is unchanged. Thus, the MOS (QN1) is controlled at the constant current zone, and the voltage (VGS) between the source and the gate of the MOS (QN1) is kept at a constant value, so that the MOS (QN1) has a constant current characteristic, and the current of the LED circuit does not contain any alternating current ripple, so as to provide a flickfree feature.

Figure 2:
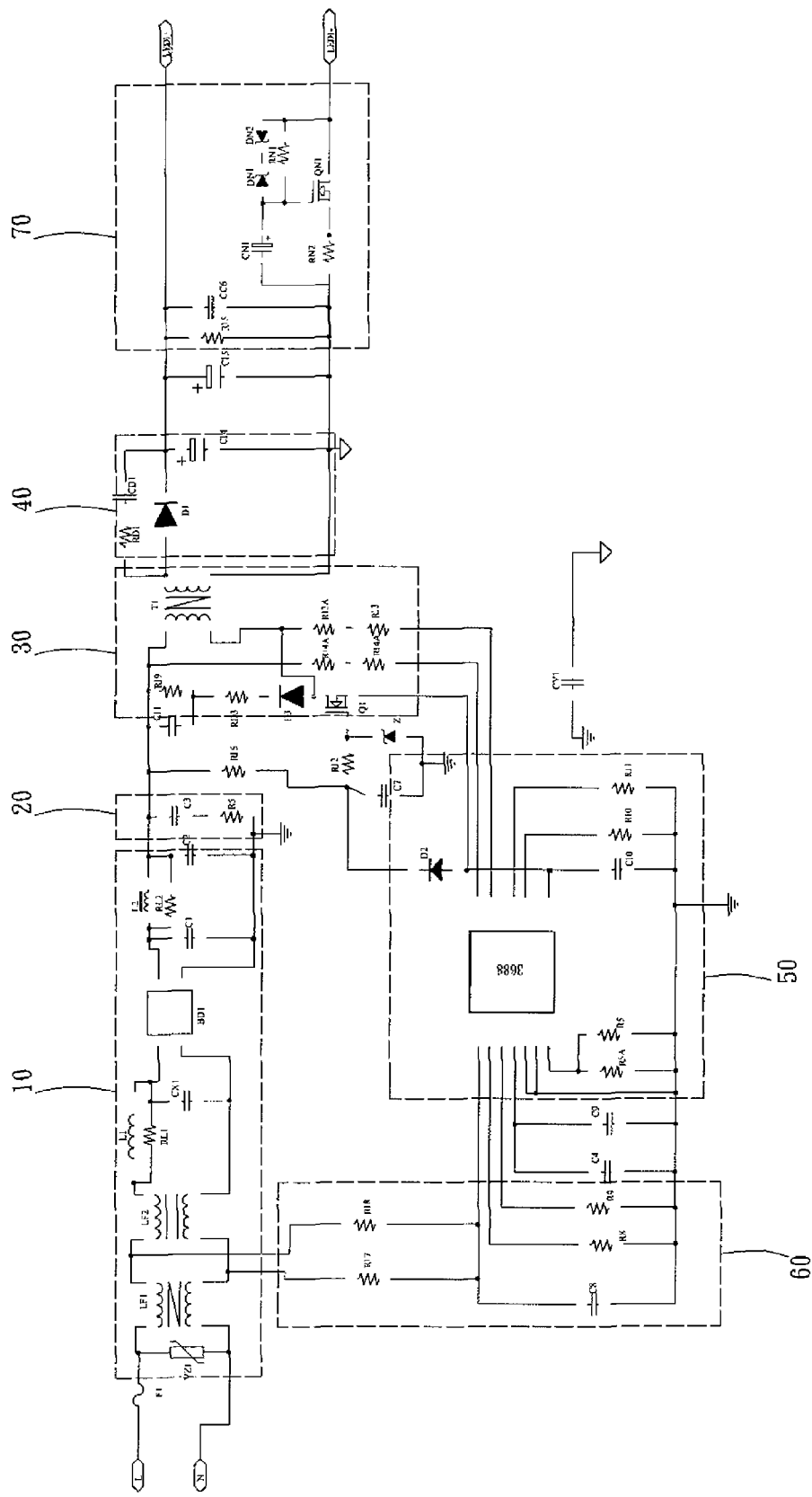
FIG. 2 is a circuit diagram of a silicon controllable dimming full-range flickfree circuit in accordance with the second preferred embodiment of the present invention.

Referring to FIG. 2, a silicon controllable dimming full-range flickfree circuit in accordance with the second preferred embodiment of the present invention also comprises the dimming circuit and the flick elimination circuit 70. The difference between the first and second preferred embodiments of the present invention is in that, in the first preferred embodiment, the MOS (QN1) is connected with the positive pole of the output terminal of the dimming circuit, and in the second preferred embodiment, the MOS (QN1) is connected with the negative pole of the output terminal of the dimming circuit. In the second preferred embodiment of the present invention, the flick elimination circuit 70 includes a resistor (RN1), a capacitor (CN1), a diode (DN1), a diode (DN2), a resistor (RN2) and a metal oxide semiconductor (MOS) (QN1).

The MOS (QN1) has a source connected with the negative pole of the output terminal of the dimming circuit through the resistor (RN2). The MOS (QN1) has a gate connected with the negative pole of the output terminal of the dimming circuit through the capacitor (CN1). The resistor (RN1) has two ends connected respectively with the gate and the drain of the MOS (QN1). The diode (DN1) is connected serially with the diode (DN2). The diode (DN1) and the diode (DN2) are connected in parallel with the resistor (RN1). The diode (DN1) and the diode (DN2) are arranged in different directions. The diode (DN1) has a negative pole (K) connected with the negative pole (K) of the diode (DN2). The drain of the MOS (QN1) functions as a negative output terminal connected with the LED circuit. Preferably, the flick elimination circuit 70 further includes a resistor (R15) and a capacitor (CC6). The resistor (R15) and the capacitor (CC6) construct an LC parallel connection circuit. The output terminal of the dimming circuit, the resistor (R15) and the capacitor (CC6) are connected in parallel.

Accordingly, the advantage of the present invention is in that, the dimming circuit and the flick elimination circuit 70 are combined, and the dimming circuit is provided with a silicon controllable dimming chip (IW3688). In addition, when the gate of the MOS (QN1) is kept at the constant current zone, the voltage of the source and the gate of the MOS (QN1) is kept at a constant value, so that the current passing through the source and the drain of the MOS (QN1) is kept at a constant value, to perform a flickfree feature of the full-power range of the high power factor, to stabilize the operation of the LED circuit, and to prevent the user's eyes from being hurt by the flick phenomenon of the LED circuit.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A silicon controllable dimming full-range flickfree circuit comprising:
a dimming circuit; and
a flick elimination circuit connected with the dimming circuit;
wherein:
the flick elimination circuit includes a metal oxide semiconductor (MOS);
the MOS is connected with a positive pole or a negative pole of an output terminal of the dimming circuit;
when the MOS is connected with the positive pole of the output terminal of the dimming circuit, the flick elimination circuit further includes a first resistor, a capacitor, a first diode, a second diode and a second resistor, the first resistor is connected serially with the capacitor, the first resistor and the capacitor are connected in parallel with the positive and negative poles of the output terminal of the dimming circuit, the first diode is connected serially with the second diode, the first diode and the second diode are connected in parallel with the first resistor, the first diode has a negative pole connected with a positive pole of the second diode, the first diode has a positive pole connected with the positive pole of the output terminal of the dimming circuit, the MOS has a gate connected with a connecting circuit between the first resistor and the capacitor through the second resistor, and the MOS has a source functioning as a positive output terminal connected with a light emitting diode (LED) circuit; and
when the MOS is connected with the negative pole of the output terminal of the dimming circuit, the flick elimination circuit further includes a first resistor, a capacitor, a first diode, a second diode and a second resistor, the MOS has a source connected with the negative pole of the output terminal of the dimming circuit through the second resistor, the MOS has a gate connected with the negative pole of the output terminal of the dimming circuit through the capacitor, the first resistor has two ends connected respectively with the gate and the drain of the MOS, the first diode is connected serially with the second diode, the first diode and the second diode are connected in parallel with the first resistor, the first diode and the second diode are arranged in different directions, the first diode has a negative pole connected with the negative pole of the second diode, and the drain of the MOS functions as a negative output terminal connected with the LED circuit.

2. The silicon controllable dimming full-range flickfree circuit of claim 1, wherein:
the flick elimination circuit further includes a resistor and a capacitor;
the resistor and the capacitor construct an LC parallel connection circuit; and
the output terminal of the dimming circuit, the resistor and the capacitor are connected in parallel.

3. The silicon controllable dimming full-range flickfree circuit of claim 1, wherein the resistor and the capacitor have a time constant which is preset to be equal to or greater than 10 ms (milliseconds).

4. The silicon controllable dimming full-range flickfree circuit of claim 1, wherein:
the dimming circuit includes an EMI (electromagnetic interference) filter rectifying circuit, an RC absorption circuit, a PWM (pulse-width modulation) control circuit, a DC-to-DC converter circuit and an output rectifier filter circuit;
the EMI filter rectifying circuit, the RC absorption circuit, the DC-to-DC converter circuit and the output rectifier filter circuit are in turn connected serially; and
the PWM control circuit is connected respectively with the EMI filter rectifying circuit and the DC-to-DC converter circuit.

5. The silicon controllable dimming full-range flickfree circuit of claim 4, wherein the dimming circuit further includes a dimming signal detection circuit connected between the EMI filter rectifying circuit and the PWM control circuit so that the PWM control circuit is connected with the EMI filter rectifying circuit through the dimming signal detection circuit.

6. The silicon controllable dimming full-range flickfree circuit of claim 4, wherein the PWM control circuit is provided with a silicon controllable dimming chip.

* * * * *